US012654490B2

(12) United States Patent
Lee

(10) Patent No.: US 12,654,490 B2
(45) Date of Patent: Jun. 16, 2026

(54) BICYCLE HUB

(71) Applicant: Ang Juen Limited Company, Taichung City (TW)

(72) Inventor: Yun-Fen Lee, Taichung City (TW)

(73) Assignee: Ang Juen Limited Company, Taichung City (TW)

( * ) Notice: Subject to any disclaimer, the term of this patent is extended or adjusted under 35 U.S.C. 154(b) by 259 days.

(21) Appl. No.: 18/679,376

(22) Filed: May 30, 2024

(65) Prior Publication Data

US 2025/0367968 A1 Dec. 4, 2025

(51) Int. Cl.
B60B 27/02 (2006.01)
B60B 27/04 (2006.01)

(52) U.S. Cl.
CPC .......... B60B 27/023 (2013.01); B60B 27/047 (2013.01)

(58) Field of Classification Search
CPC ... B60B 27/0073; B60B 27/023; B60B 27/04; B60B 27/047; F16D 11/14; B60Y 2200/13
See application file for complete search history.

(56) References Cited

U.S. PATENT DOCUMENTS

| | | | |
|---|---|---|---|
| 6,244,405 B1 * | 6/2001 | Chen ..................... | B60B 27/023 192/64 |
| 10,780,737 B2 * | 9/2020 | Nakajima ............. | B60B 27/023 |
| 2023/0182505 A1 * | 6/2023 | Elsner ..................... | F16D 41/36 301/6.5 |
| 2024/0149616 A1 * | 5/2024 | Spahr .................. | B60B 27/0031 |
| 2026/0061774 A1 * | 3/2026 | Gasser ................. | B60B 27/023 |

FOREIGN PATENT DOCUMENTS

| | | | | |
|---|---|---|---|---|
| DE | 202011108822 U1 * | 2/2012 | ............. | F16D 41/36 |
| DE | 202021106715 U1 * | 2/2022 | ........... | B60B 27/023 |

* cited by examiner

*Primary Examiner* — Adam D Rogers
(74) *Attorney, Agent, or Firm* — Apex Juris, pllc; Cera Oh

(57) ABSTRACT

A bicycle hub includes an axle and a hub body disposed on the axle and having an abutting portion and an inner bevel gear in an end portion of the hub body. A ratchet seat rotatably fits around the axle and includes a freehub body and an insertion tube inserted into the end portion of the hub body. An outer bevel gear fits around the insertion tube to be slidable only in an axial direction, meshes the inner bevel gear, and is abutted by the abutting portion to be retained in the inner bevel gear. An elastic body adapted to push the outer bevel gear toward the inner bevel gear is disposed on the ratchet seat.

9 Claims, 16 Drawing Sheets

BICYCLE HUB

BACKGROUND OF THE INVENTION

Technical Field

The present invention relates generally to a bicycle hub, and more particularly to a bicycle hub that uses an inner bevel gear and an outer bevel gear to achieve a clutching effect.

Description of Related Art

A conventional bicycle hub is to fit a hub body and a ratchet seat around an axle and dispose a unidirectional rotation structure, which is a ratchet gear matching with a plurality of pawls, between the hub body and the ratchet seat. When the axle is disposed on a rear end of a bicycle frame, the hub body is connected to a plurality of spokes for disposing a rim and a rear wheel. A freewheel is disposed on the ratchet seat and is adapted to engage a chain on the freewheel and a crankset of a bicycle. In this way, when a user of the bicycle pedals forward, the crankset drives the freewheel and the ratchet seat to rotate forwardly through the chain; meanwhile, the hub body and the rear wheel that the hub body is disposed on are driven by the unidirectional rotation structure of the pawls to rotate forwardly together.

In contrast, when the user does not pedal and the bicycle slides forwardly due to an inertia or the user pedals reversely, the freewheel and the ratchet seat rotate reversely relative to the hub body; at that time, the pawls slide off from the ratchet, thereby achieving a detached state of the unidirectional rotation structure; the rear wheel is released and rotates due to the inertia without being driven by the freewheel that rotates reversely. The hub of the conventional bicycle hub could be driven by the chain to perform the unidirectional rotation along with the hub body and the rear wheel. However, when the pawls in the hub body slide off from the ratchets, the pawls are moved and bounced between a plurality of ratchet teeth, thereby causing a large noise due to the collision between the pawls and the ratchet teeth. When repairing the pawls is needed, the pawls are required to be disassembled separately, which makes the repair more troubling.

BRIEF SUMMARY OF THE INVENTION

In view of the above, the primary objective of the present invention is to provide a bicycle hub, wherein an inner bevel gear and an outer bevel gear are disposed between a hub body and a ratchet seat and serve as a clutch assembly, so that only a unidirectional rotation between the hub body and a ratchet gear could be allowed; in addition to reducing the noise during operation, the inner bevel gear and the outer bevel gear that mesh with each other provide an effect of high transmission efficiency and are conducive to installing and repairing easily.

The present invention provides a bicycle hub, including an axle, a hub body, a ratchet seat, and a clutch assembly. An axis of the axle is defined as an axial direction. The hub body coaxially and rotatably fits around the axle. Two opposite sides of the hub body in the axial direction have a first end portion and a second end portion respectively. An inner side of the first end portion, along a direction from the second end portion to the first end portion, sequentially has an abutting portion and an inner bevel gear that is concentric with the axle. An inner peripheral surface of the inner bevel gear has a plurality of inner bevel teeth around the axle, wherein each of the plurality of inner bevel teeth is inclined relative to the axial direction.

The ratchet seat coaxially and rotatably fits around the axle. The ratchet seat has a freehub body, an insertion tube, and an annular wall that is connected to the freehub body and the insertion tube. The insertion tube has an outside diameter less than an outside diameter of the freehub body. The insertion tube is inserted into the first end portion.

The clutch assembly includes an outer bevel gear and an elastic body. The outer bevel gear fits around the insertion tube in a manner that the outer bevel gear is slidable only in the axial direction. An outer peripheral surface of the outer bevel gear has a plurality of outer bevel teeth. The plurality of outer bevel teeth surrounds the axle and are adapted to mesh with the plurality of inner bevel teeth. Each of the plurality of outer bevel teeth is inclined relative to the axial direction. When the outer bevel gear meshes and enters the inner bevel gear, the outer bevel gear is abutted by the abutting portion to be retained in the inner bevel gear. The elastic body is disposed between the outer bevel gear and the annular wall in a compressible manner and is adapted to push the outer bevel gear toward the inner bevel gear along the axial direction.

When the present invention is used, the bicycle hub is disposed on a bicycle, the hub body is connected to a plurality of spokes for disposing a rim and a rear wheel, a freewheel is mounted on the freehub body of the ratchet seat, and a chain is engaged between the freewheel and a crankset of the bicycle. A user could forwardly rotate pedals connected to the crankset along a cycling direction and drive the freewheel and the ratchet seat to rotate forwardly through the chain; or the user could reversely rotate the pedals connected to the crankset and drive the freewheel and the freehub to rotate reversely through the chain.

With the aforementioned design, when the ratchet seat rotates forwardly relative to the hub body, the elastic body pushes the outer bevel gear to move toward the second end portion, so that the outer bevel teeth of the outer bevel gear mesh with the inner bevel teeth of the inner bevel gear, and the outer bevel gear enters the inner bevel gear; at that time, the outer bevel gear is abutted by the abutting portion and is maintained in a state of meshing with the inner bevel gear, so that the ratchet seat, which rotates forwardly, could drive the hub body to rotate forwardly through the outer bevel gear of the clutch assembly. On the other hand, when the ratchet seat rotates reversely relative to the hub body, the ratchet seat could drive the outer bevel gear to rotate reversely relative to the inner bevel gear; as the outer bevel teeth and the inner bevel teeth mesh with each other in the inclined manner, the outer bevel gear moves oppositely to disengage from the inner bevel gear; the outer bevel gear that is disengaged from the inner bevel gear continuously abuts against a side wall of the inner bevel gear with the side of the outer bevel gear facing the inner bevel gear.

In this way, the present invention could enable the ratchet seat to rotate unidirectionally relative to the hub body through the clutch assembly. Since the outer bevel gear and the inner bevel gear do not bounce and collide during the clutch process, the noise could be effectively reduced. The clutch assembly is engaged and disengaged with inner bevel gear through the outer bevel gear, so that the present invention could facilitate installation and repair compared to the conventional bicycle hub that requires installing multiple pawls.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
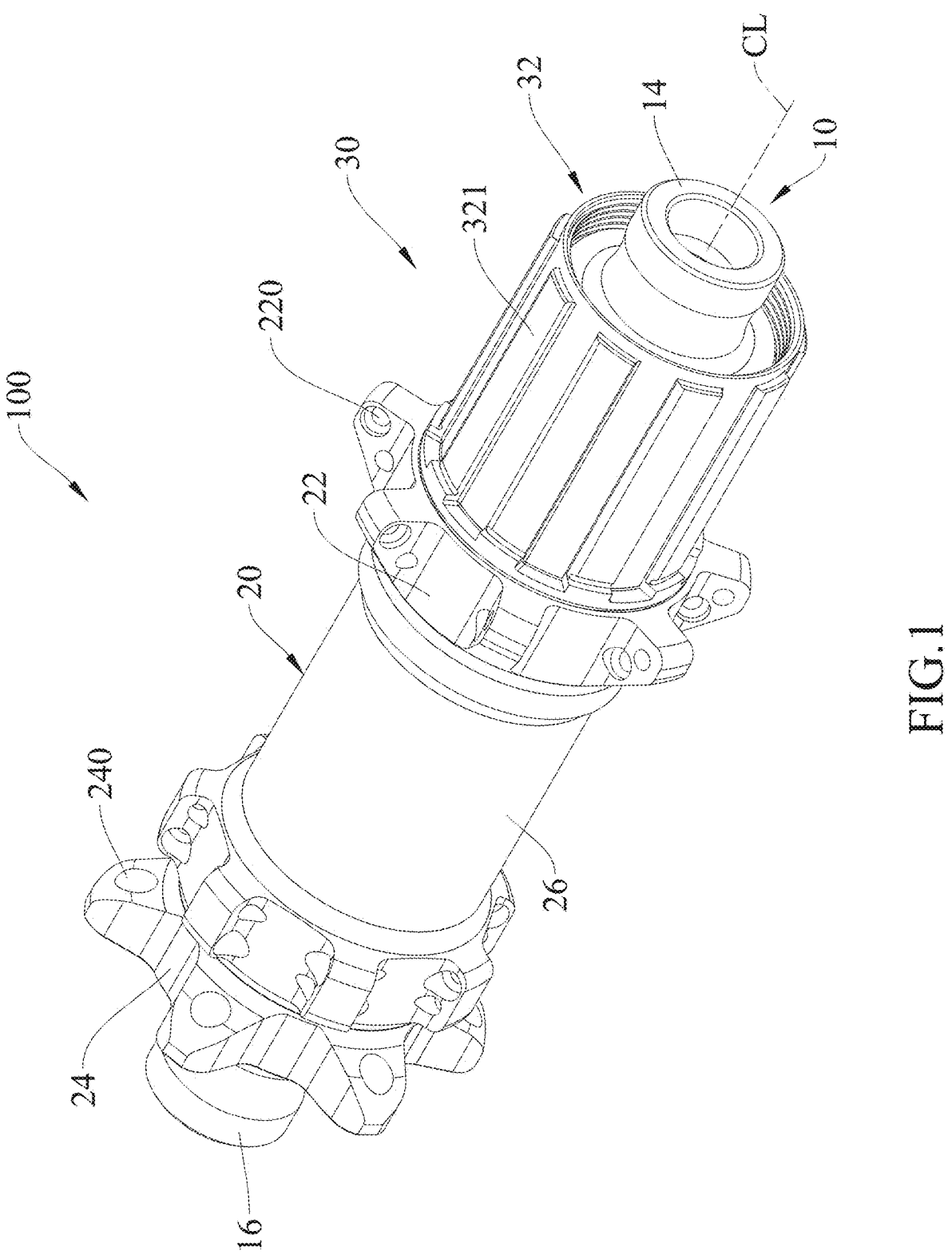
FIG. 1 is a perspective view of the bicycle hub according to a first embodiment of the present invention.

A bicycle hub 100 according to a first embodiment of the present invention is illustrated in FIG. 1 to FIG. 6 and includes an axle 10, a hub body 20, a ratchet seat 30, and a clutch assembly 40.

Figure 2:
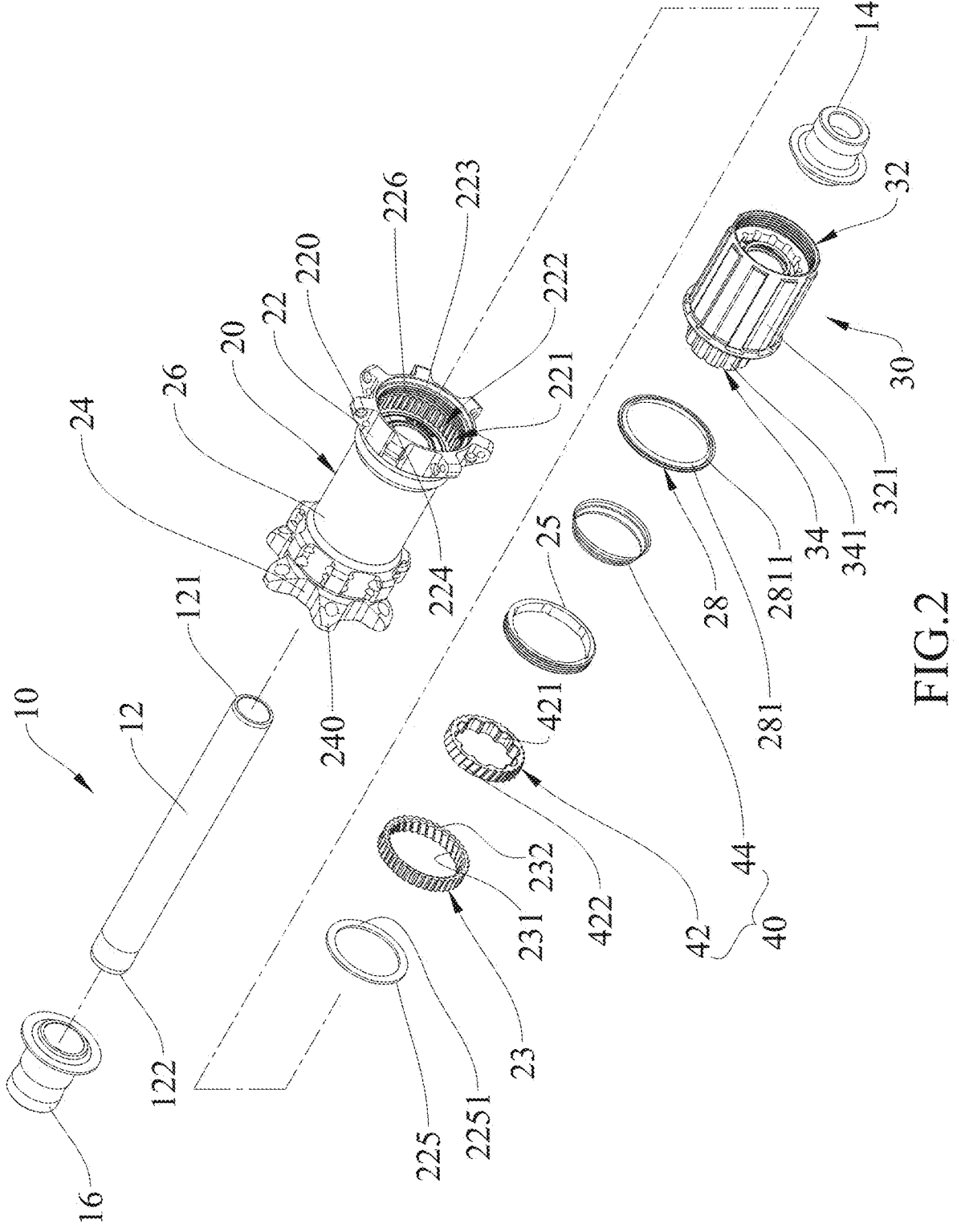
FIG. 2 is an exploded view of the bicycle hub according to the first embodiment of the present invention.
Figure 3:
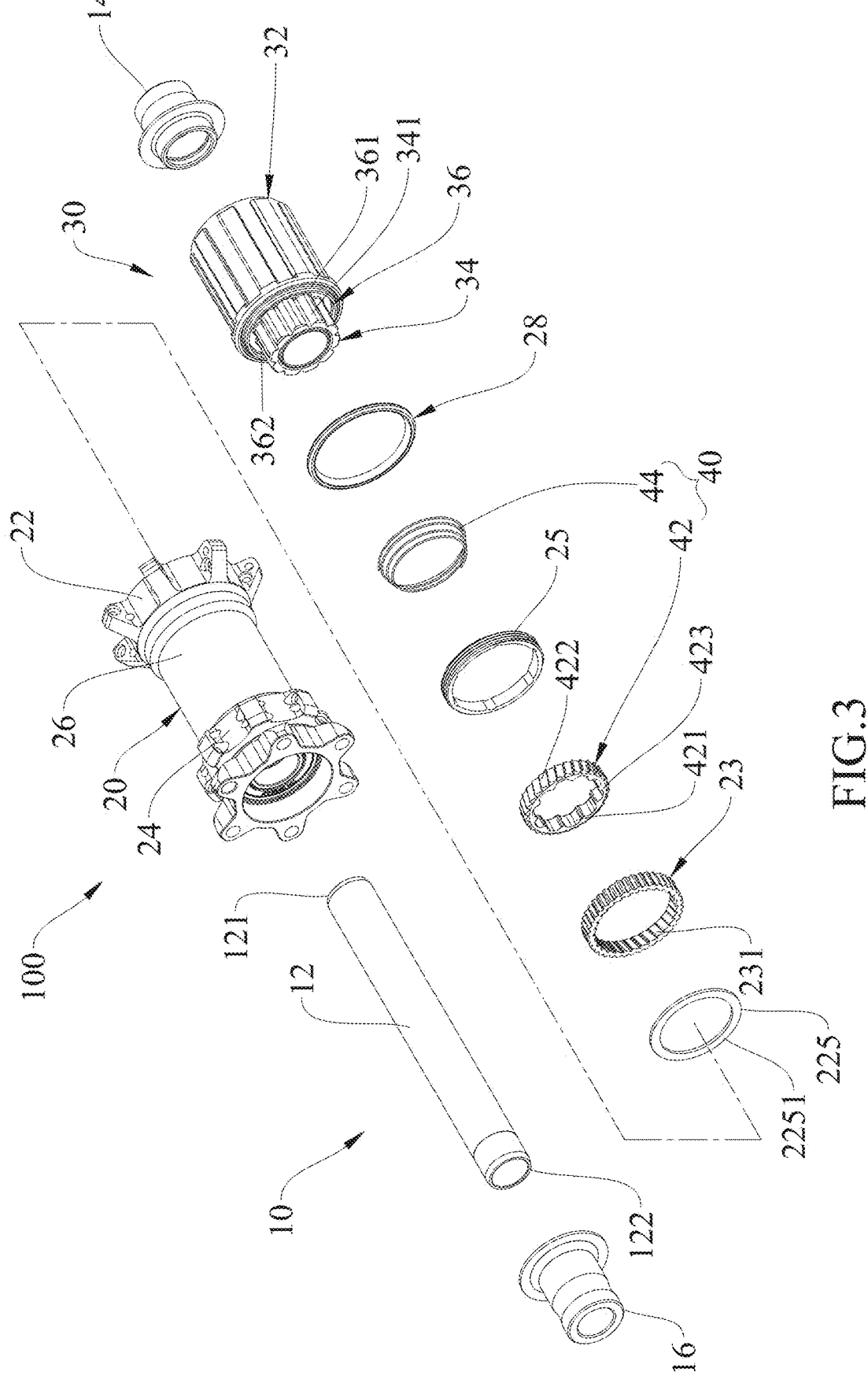
FIG. 3 is an exploded view the bicycle hub according to of the first embodiment of the present invention seen from another direction.
Figure 4:
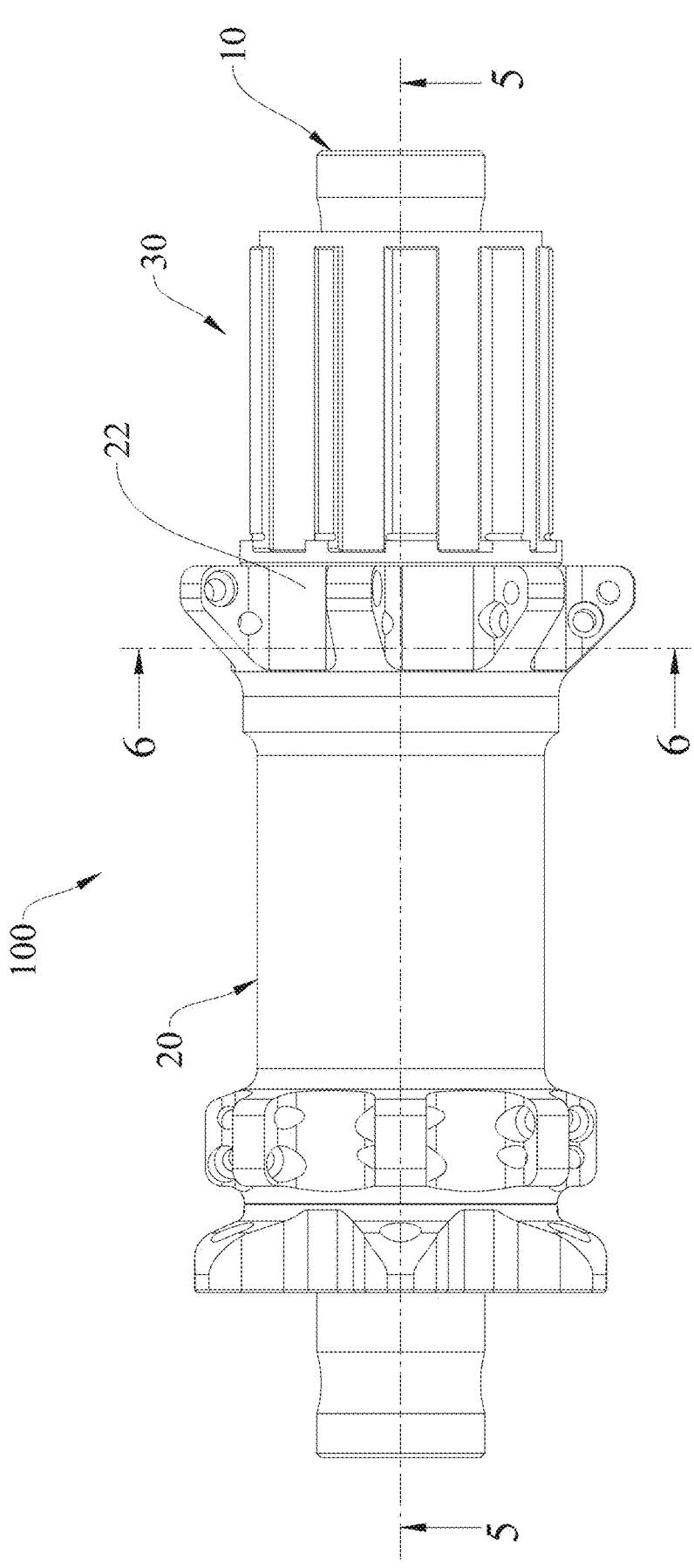
FIG. 4 is a top view of the bicycle hub in FIG. 1.

Referring to FIG. 1 to FIG. 3, an axis of the axle 10 is defined as an axial direction CL. In particular, the axle 10 includes an axle tube 12, a first axle seat 14, and a second axle seat 16. Two opposite ends of the axle tube 12 have a first end 121 and a second end 122, respectively. The first axle seat 14 is a sleeve and fits around the first end 121 of the axle tube 12. The second axle seat 16 is a sleeve and fits around the second end 122 of the axle tube 12.

Referring to FIG. 2 to FIG. 3 and FIG. 5 to FIG. 6, the hub body 20 coaxially and rotatably fits around the axle tube 12 of the axle 10. Two opposite sides of the hub body 20 in the axial direction CL have a first end portion 22 and a second end portion 24 respectively. An intermediate tube 26 that is disposed on a middle of the hub body 20 is connected between the first end portion 22 and the second end portion 24. Two opposite sides of the intermediate tube 26 in the axial direction CL are respectively connected to the first end portion 22 and the second end portion 24. An outer peripheral surface of the first end portion 22 has a plurality of first spoke seats 220. An outer peripheral surface of the second end portion 24 has a plurality of second spoke seats 240. A first bearing assembly 27 is disposed on an inner peripheral surface of the intermediate tube 26. The first bearing assembly 27 includes two first bearings 271. The axle tube 12 of the axle 10 rotatably passes through the two first bearings 271 of the first bearing assembly 27, so that each of the first bearings 271 is rotatably disposed between the intermediate tube 26 and the axle tube 12. The first end 121 of the axle tube 12 penetrates out of the first end portion 22 of the hub body 20. The second end 122 of the axle tube 12 penetrates out of the second end portion 24 of the hub body 20.

An inner side of the hub body 20 has an axle hole 201 along the axial direction CL, wherein the axle 10 passes through the axle hole 201. A portion of the axle hole 201 corresponding to the first end portion 22 form a first tube section 221, a second tube section 222, and a third tube section 223 in sequence in a direction from the second end portion 24 to the first end portion 22. A radial length of the first tube section 221 in a direction perpendicular to the axial direction CL is less than a radial length of the second tube section 222 in the direction perpendicular to the axial direction CL. The radial length of the second tube section 222 in the direction perpendicular to the axial direction CL is less than a radial length of the third tube section 223 in the direction perpendicular to the axial direction CL. The third tube section 223 is located on a side of the second tube section 222 away from the second end portion 24.

The first tube section 221 is a non-circular groove. In the current embodiment, the first tube section 221 is a star-shaped groove with a hole wall having a plurality of successive concave-convex structure, wherein a side of the first tube section 221 facing the second end portion 24 has an annular inner wall 224 that is circular. A stop washer 225 that is circular is provided to abut against the annular inner wall 224, wherein an abutting portion 2251 is formed on an inner peripheral edge of the stop washer 225. An inner bevel gear 23 fits in the first tube section 221. The inner bevel gear 23 is fixed in the first tube section 221 and is non-rotatable relative to the hub body 20. An inner peripheral surface of the inner bevel gear 23 has a plurality of inner bevel teeth 231, wherein the inner bevel teeth 231 surround the axle tube 12 of the axle 10 and are respectively a ratchet tooth.

Figure 5:
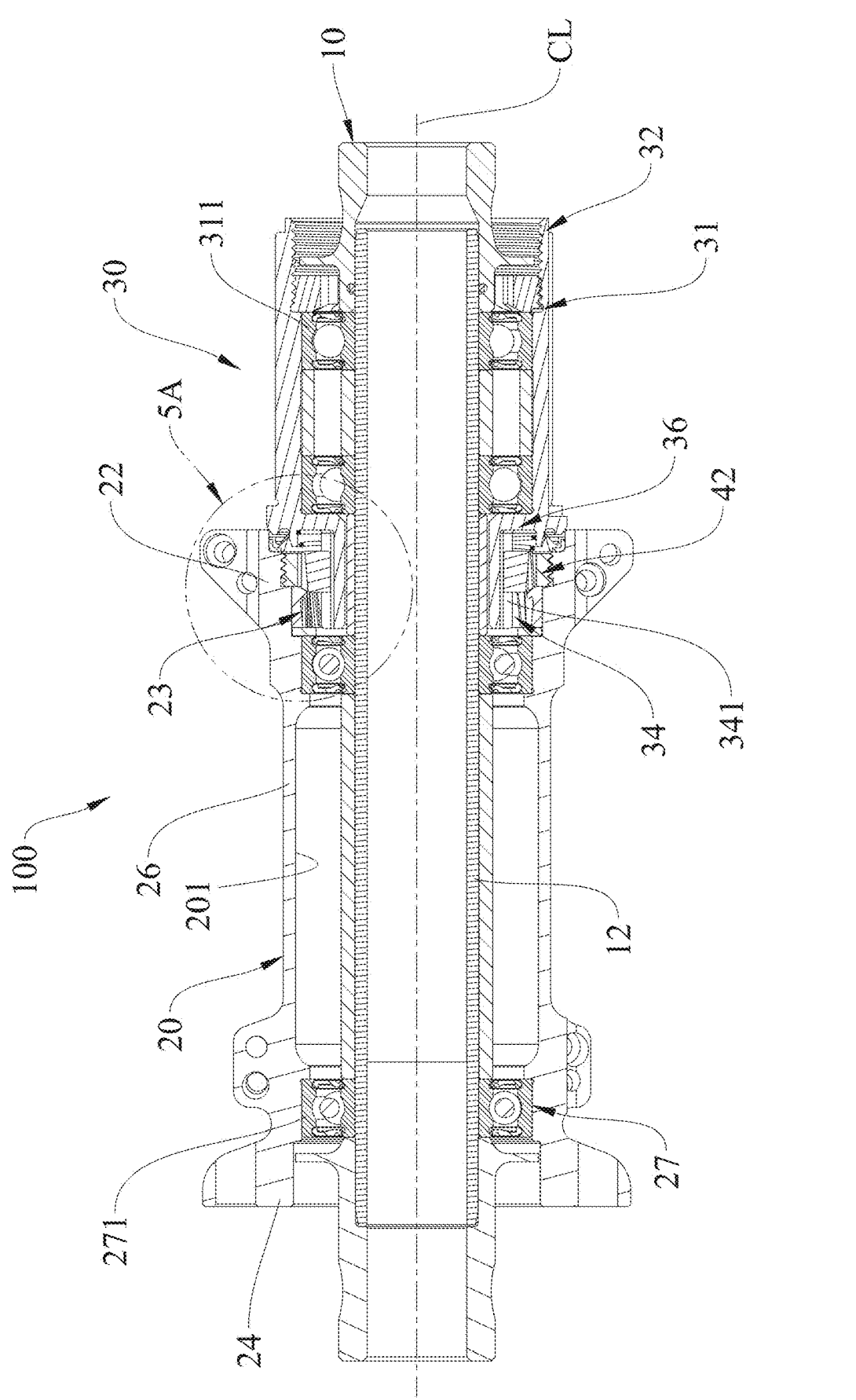
FIG. 5 is a sectional view along the 5-5 line in FIG. 4.
Figure 7A:
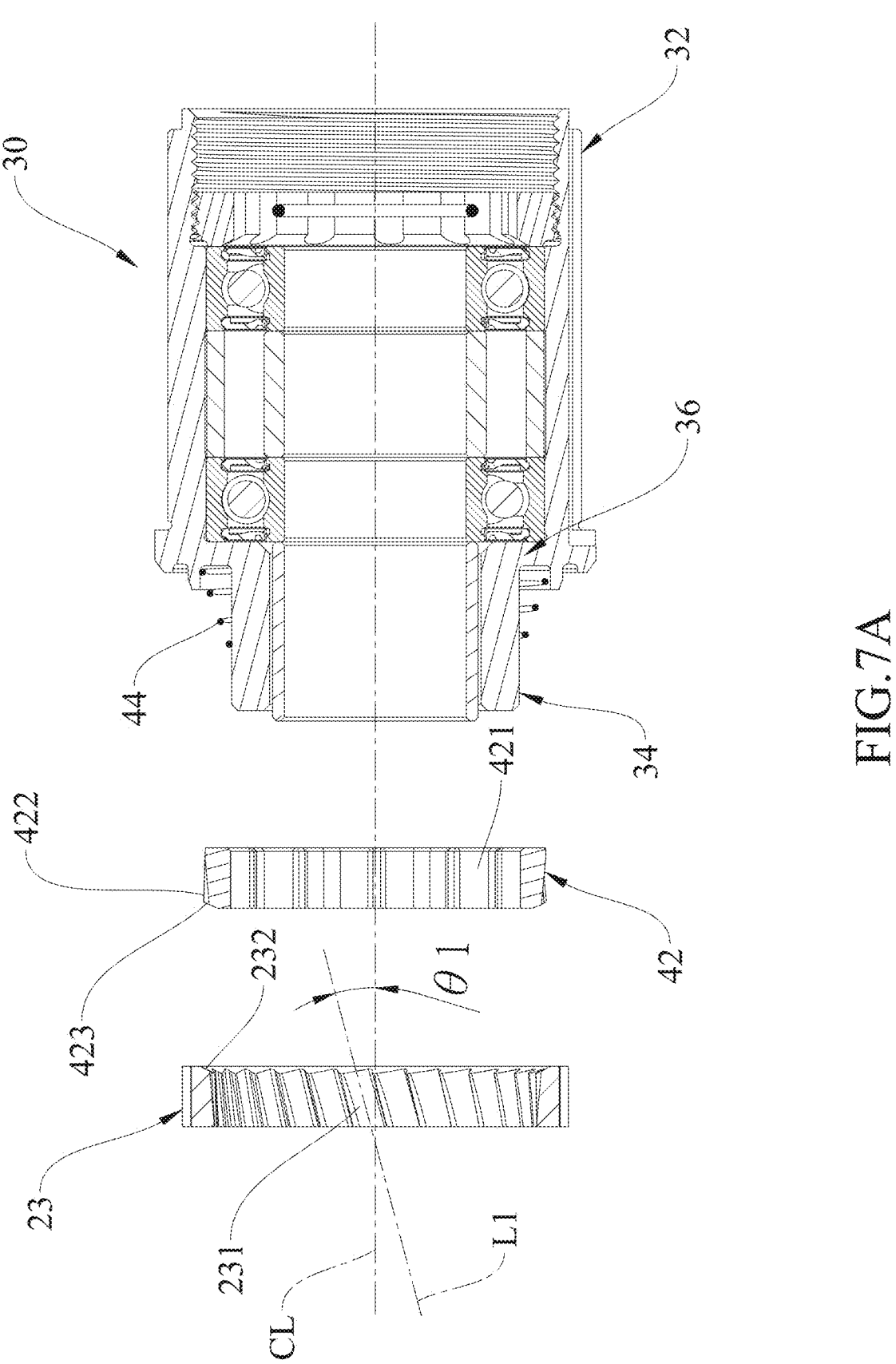
FIG. 7A is a sectional schematic view, showing the matching relationship of the ratchet seat, the outer bevel gear, and the inner bevel gear shown in FIG. 5.

Referring to FIG. 5 and FIG. 7A, each of the inner bevel teeth 231 is inclined relative to the axial direction CL and has a first inclination direction L1. An angle between the first inclination direction L1 and the axial direction CL is a first inclination angle $\theta 1$, wherein the first inclination angle $\theta 1$ is between 5 degrees and 60 degrees. In the current embodiment, the first inclination angle $\theta 1$ is 15 degrees. A side wall of the inner bevel gear 23 away from the abutting portion 2251 (i.e., facing the second tube section 222) has a first annular bevel 232. With the aforementioned design, the abutting portion 2251 and the inner bevel gear 23 that is coaxial with the axle tube 12 of the axle 10 are sequentially disposed in the direction from the second end portion 24 to the first end portion 22 on an inner side of the first end portion 22 of the hub body 20 of the current embodiment.

Figure 6:
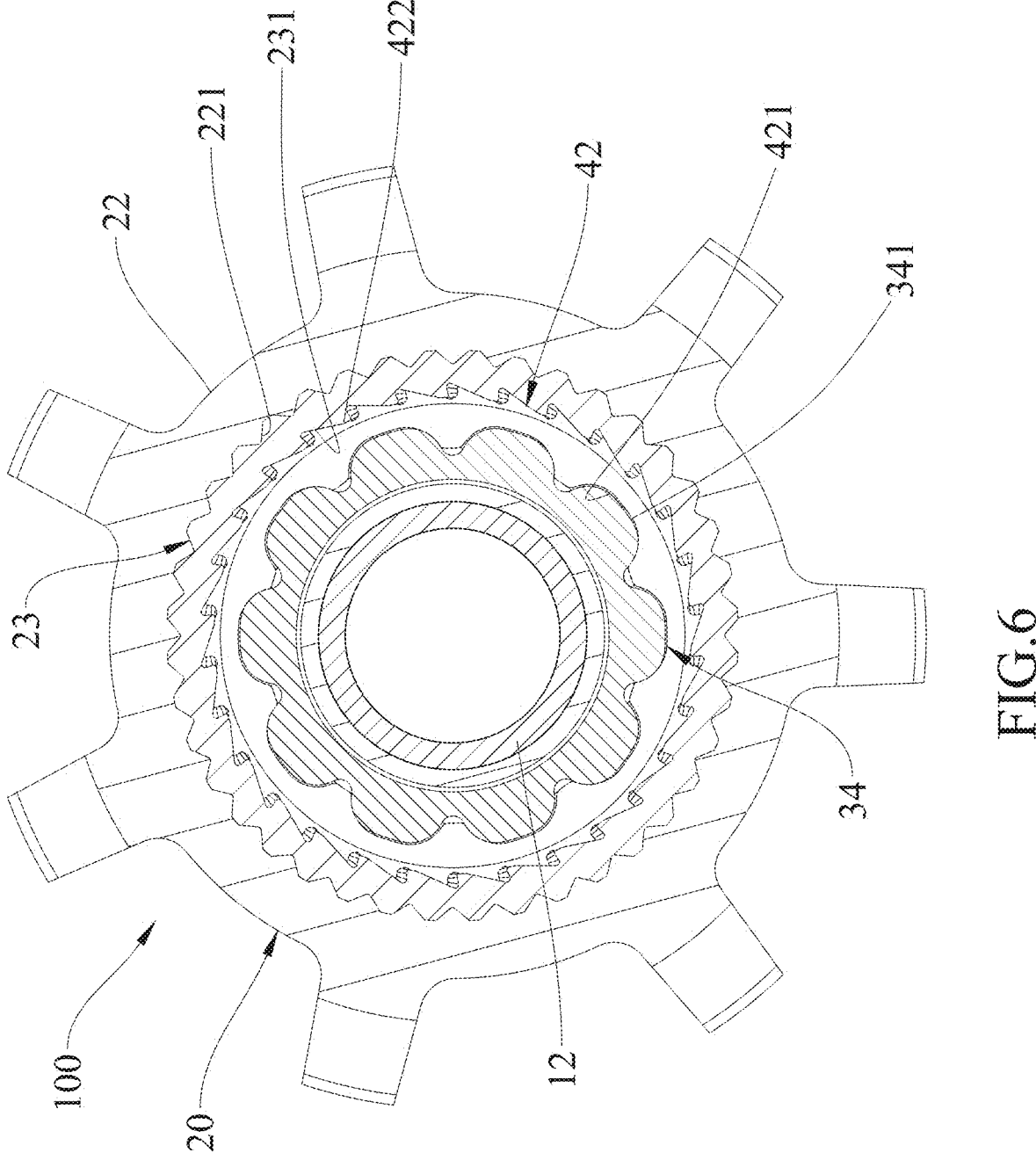
FIG. 6 is a sectional view along the 6-6 line in FIG. 4.

Referring to FIG. 2 and FIG. 5 to FIG. 6, an inner peripheral surface of the second tube section 222 has an inner thread 226. The inner thread 226 is detachably engaged with a fixing ring 25 in a screwing manner, wherein the fixing ring 25 abuts against the side of the inner bevel gear 23 facing the second tube section 222, so that the inner bevel gear 23 is restricted within the first tube section 221 for fixing. A sealing ring 28 that is annular fits in the third tube section 223 and has a ring disk 281, wherein the ring disk 281 has an end edge 2811.

The ratchet seat 30 coaxially and rotatably fits around a side of the axle tube 12 of the axle 10 that penetrates out of the first end portion 22. The ratchet seat 30 has a freehub body 32, an insertion tube 34, and an annular wall 36 that are coaxial with the axle 10, wherein the annular wall 36 is connected between the freehub body 32 and the insertion tube 34. The freehub body 32 rotatably fits around the axle tube 12 and is located between the first end portion 22 and the first axle seat 14. A periphery of the freehub body 32 has a spline portion 321 for mounting and securing a freewheel. A second bearing assembly 31 is disposed on an inner peripheral surface of the freehub body 32 and includes two second bearings 311. The axle tube 12 of the axle 10 rotatably passes through the two second bearings 311 of the second bearing assembly 31, so that each of the second bearings 311 is rotatably disposed between the freehub body 32 and the axle tube 12 of the axle 10.

An outer diameter of the insertion tube 34 in the direction perpendicular to the axial direction CL is less than an outer diameter of the freehub body 32 in the direction perpendicular to the axial direction CL. The insertion tube 34 is inserted into the first end portion 22 of the hub body 20. The insertion tube 34 sequentially penetrates through the sealing ring 28, the fixing ring 25, the inner bevel gear 23 in a direction from the first end portion 22 to the second end portion 24, and the insertion tube 34 abuts against a middle of the stop washer 225. An outer peripheral surface of the insertion tube 34 has an outer spline 341, wherein an extension direction of the outer spline 341 is parallel to the axial direction CL. The annular wall 36 is an annular wall surface and is concentrically connected to a protruding ring 361, wherein the protruding ring 361 extends into the third tube section 223. The ring disk 281 of the sealing ring 28 that fits in the third tube section 223 abuts against an outer peripheral surface of the protruding ring 361 with the end edge 2811. A portion of the annular wall 36 located between the protruding ring 361 and the insertion tube 34 forms a spring groove 362.

Referring to FIG. 2 to FIG. 3 and FIG. 5 to FIG. 6, the clutch assembly 40 includes an outer bevel gear 42 and an elastic body 44. An inner peripheral surface of the outer bevel gear 42 has an inner spline 421. The inner spline 421 fits around the insertion tube 34 of the ratchet seat 30 in a slidable manner along the axial direction CL. The inner spline 421 meshes with the outer spline 341 of the insertion tube 34. At that time, the outer bevel gear 42 could only slide on the insertion tube 34 along the axial direction CL and could not rotate relative to the insertion tube 34. The elastic body 44 is adapted to push the outer bevel gear 42 to move toward the second end portion 24 along the axial direction CL. In other embodiments, the outer spline 341 could be replaced by forming a non-circular surface, such as an elliptical surface or a polygonal surface, on the outer peripheral surface of the insertion tube 34, and another non-circular surface matching with the non-circular surface of the insertion tube 34, such as an elliptical surface or a polygonal surface, is formed on the inner peripheral surface of the outer bevel gear 42. In this way, when outer bevel gear 42 fits around the insertion tube 34, the outer bevel gear 42 could move on the insertion tube 34 in a slidable manner only along the axial direction CL.

Figure 7B:
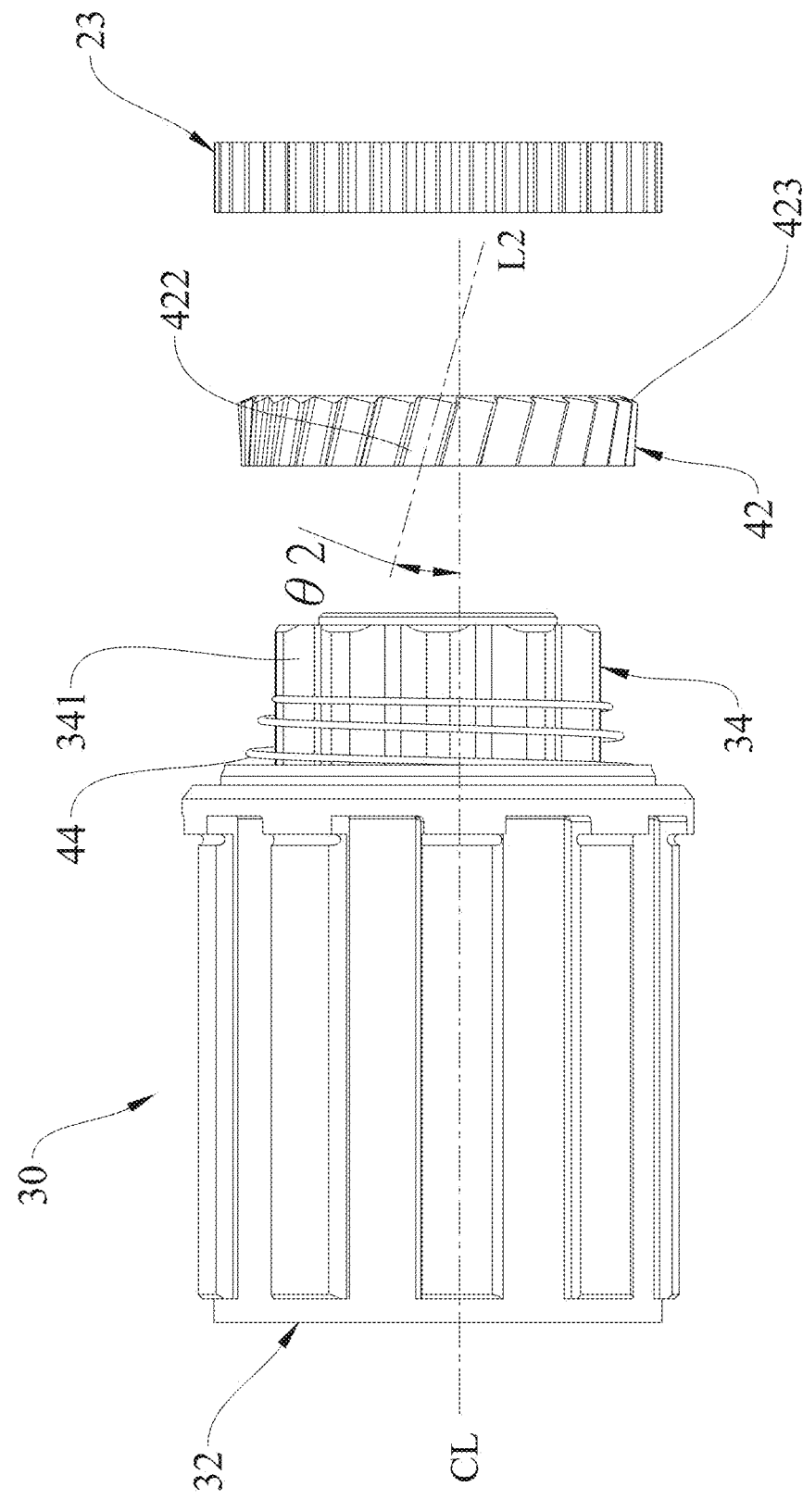
FIG. 7B is another schematic view showing the matching relationship of the ratchet seat, the outer bevel gear, and the inner bevel gear shown in FIG. 7A.

An outer peripheral surface of the outer bevel gear 42 has a plurality of outer bevel teeth 422. The outer bevel teeth 422 surround the axle 10 and are adapted to mesh with the inner bevel teeth 231 of the inner bevel gear 23, thereby achieving the engaging state between the outer bevel gear 42 and the inner bevel gear 23. A side wall of the outer bevel gear 42 facing the inner bevel gear 23 has a second annular bevel 423. Referring to FIGS. 7A and 7B, each of the outer bevel teeth 422 is a ratchet tooth and is inclined relative to the axial direction CL. An inclination direction of each of the outer bevel teeth 422 is the same as an inclination direction of each of the inner bevel teeth 231. An inclination angle of each of the outer bevel teeth 422 relative to the axial direction CL is the same as an inclination angle of each of the inner bevel teeth 231 relative to the axial direction CL.

Referring to FIG. 3, FIG. 5A, FIG. 8, and FIG. 8A, when the outer bevel gear 42 operates along with the ratchet seat 30 and the insertion tube 34 to rotate forwardly around the axial direction CL relative to the hub body 20 and the inner bevel gear 23 and the outer bevel gear 42 is subjected to a pushing force of the elastic body 44 in a direction toward the second end portion 24, the outer bevel teeth 422 of the outer bevel gear 42 mesh with the inner bevel teeth 231 of the inner bevel gear 23 and hence the outer bevel gear 42 enters the inner bevel gear 23. Once the outer bevel teeth 422 of the outer bevel gear 42 mesh and enter the inner bevel teeth 231, the outer bevel teeth 422 and the inner bevel teeth 231 mesh with each other in an inclined manner (i.e., the inner bevel gear 23 exerts an axial force on the outer bevel gear 42 in the direction toward the second end portion 24), so that the outer bevel gear 42 enters the inner bevel gear 23 in a meshing manner. In the process of the outer bevel gear 42 meshing to enter the inner bevel gear 23, a depth that the outer bevel teeth 422 mesh with the inner bevel teeth 231 gradually increases and eventually the outer bevel gear 42 is abutted and stopped by the abutting portion 2251, thereby maintaining a state that the outer bevel gear 42 is meshed inside the inner bevel gear 23; meanwhile, the ratchet seat 30, which rotates forwardly, could drive the hub body 20 to rotate forwardly through the outer bevel gear 42 of the clutch assembly 40.

Figure 8:
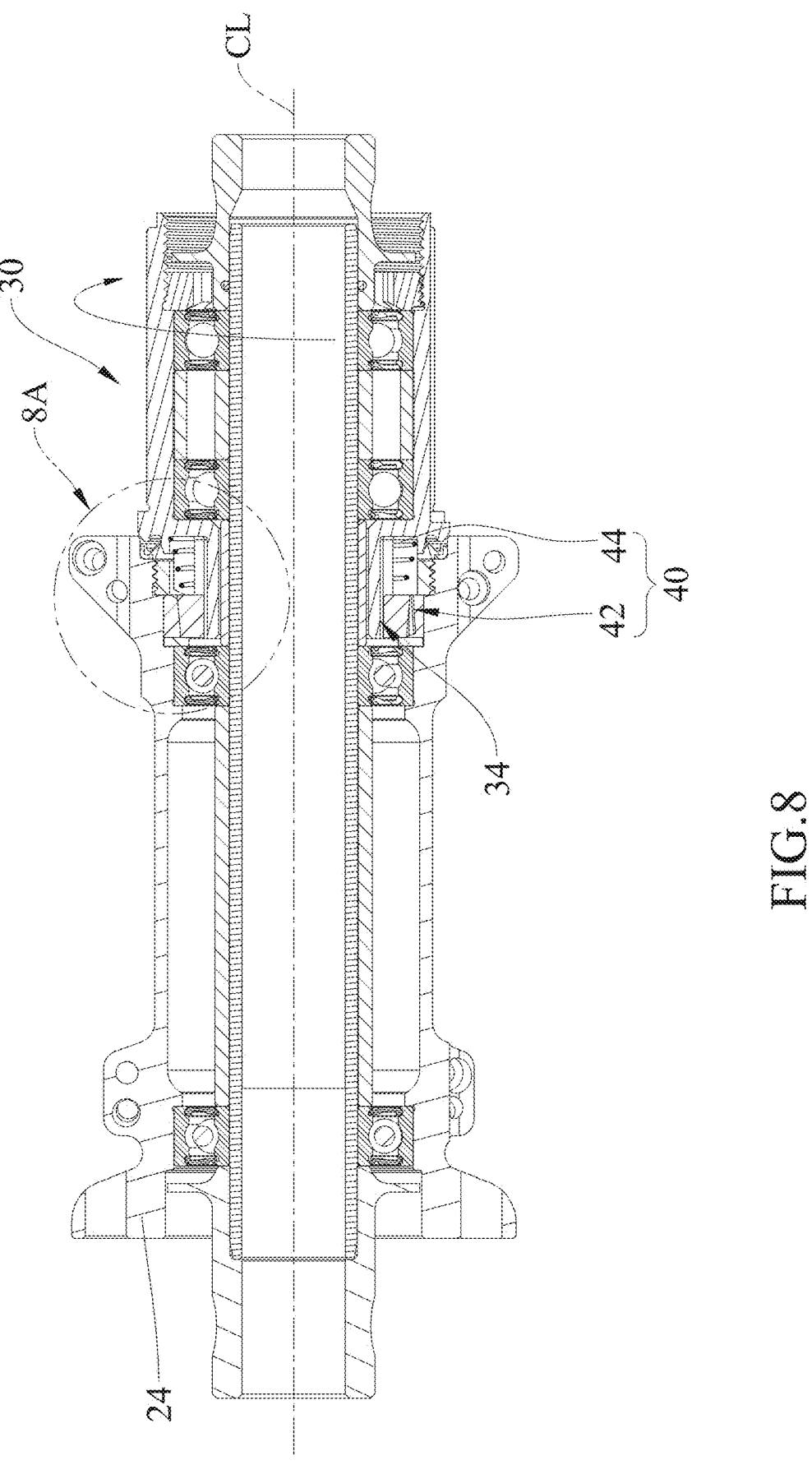
FIG. 8 is a schematic view showing that the ratchet seat according to the first embodiment of the present invention rotates forwardly.
Figure 8A:
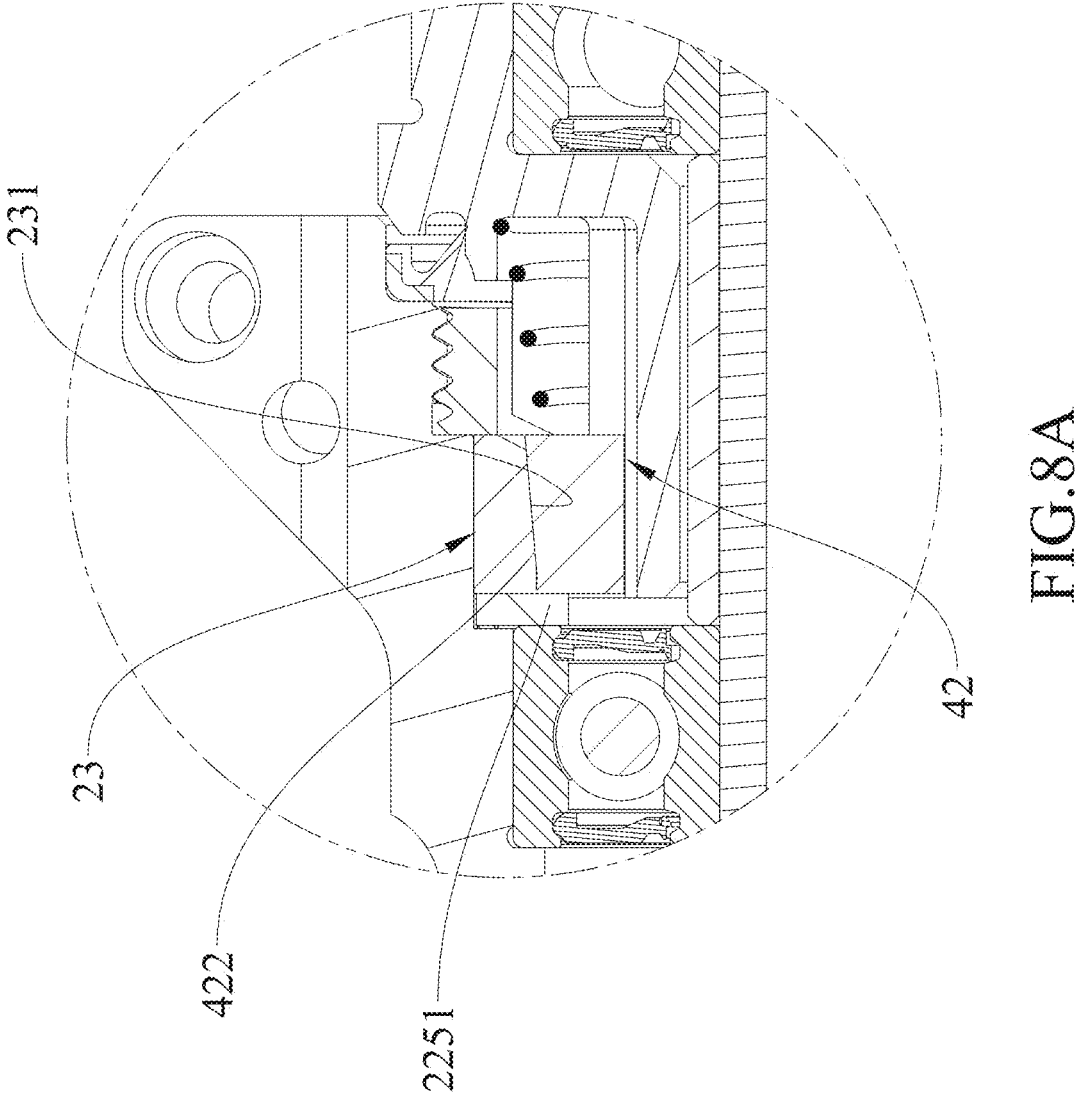
FIG. 8A is an enlarged view of a marked region 8A in FIG. 8.
Figure 9:
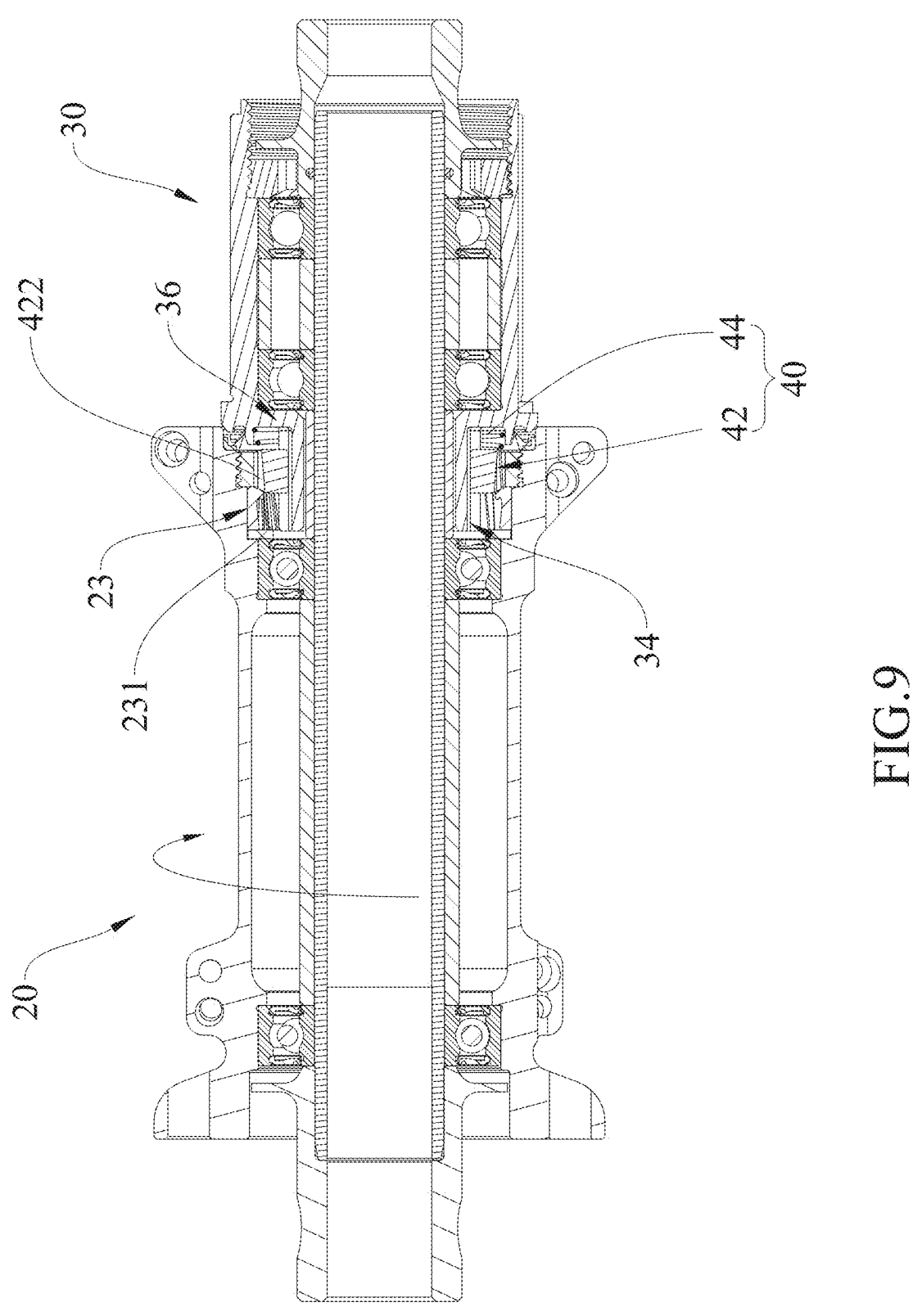
FIG. 9 is a schematic view showing the ratchet seat shown in FIG. 8 rotates reversely relative to the hub body.

On the other hand, referring to FIG. 8 to FIG. 9, when the outer bevel gear 42 operates along with the ratchet seat 30 and the insertion tube 34 to rotate reversely relative to the hub body 20 and the inner bevel gear 23, two scenarios are resulted; one of the scenarios is that the hub body 20 rotates forwardly while the ratchet seat 30 is stationary; the other scenario is that the ratchet seat 30 rotates reversely while the hub body 20 is stationary. In the aforementioned two scenarios resulted from outer bevel gear 42 rotating reversely relative to the inner bevel gear 23, because the outer bevel teeth 422 of the outer bevel gear 42 obliquely mesh with the inner bevel gear 23, the inner bevel gear 23 exerts an axial force on the outer bevel gear 42 in a direction toward the annular wall 36, so that the outer bevel gear 42 to move in the direction toward the annular wall 36 and eventually a disengaging state between the outer bevel gear 42 and the inner bevel gear 23 is resulted. Therefore, the ratchet seat 30 that rotates reversely relative to the hub body 20 is not driven by the hub body 20, which rotates forwardly relative to the ratchet seat 30 for rotating forwardly, and the ratchet seat 30, which rotates reversely, does not drive the hub body 20 for rotating reversely.

Referring to FIG. 7B, each of the outer bevel teeth 422 has a second inclination direction L2. An angle between the second inclination direction L2 and the axial direction CL is a second inclination angle θ2. The second inclination angle θ2 is between 5 degrees and 60 degrees. In the current embodiment, the second inclination angle θ2 is 15 degrees. As mentioned above, referring to FIG. 5 and FIG. 5A, in order to stop outer bevel gear 42 with the abutting portion 2251 when the outer bevel gear 42 meshes and enters the inner bevel gear 23, at least a portion of the abutting portion 2251 directly faces a side of the outer bevel gear 42, which faces the second end portion 24, along the axial direction CL.

Figure 5A:
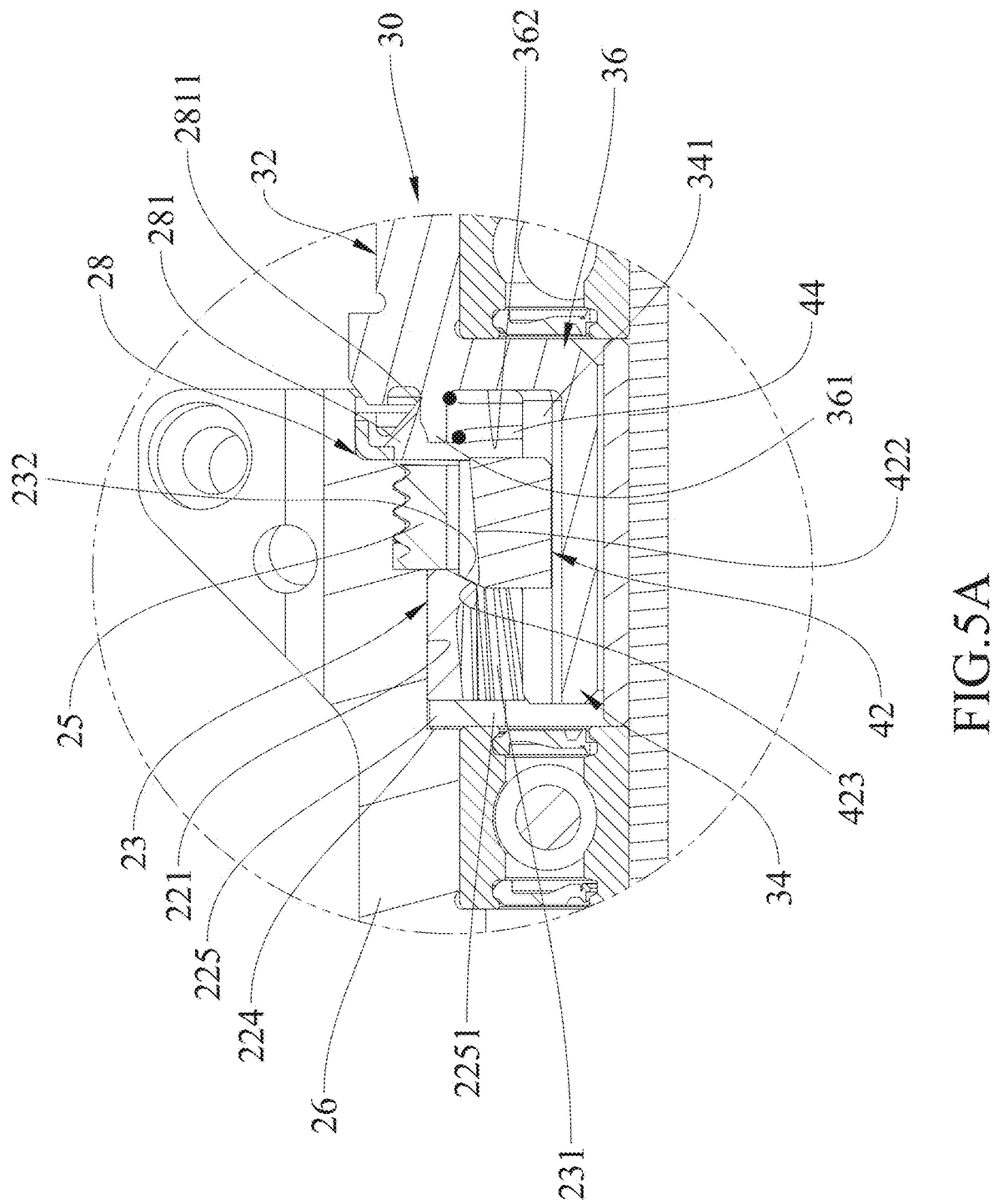
FIG. 5A is an enlarged view of a marked region 5A in FIG. 5.

Referring to FIG. 5 and FIG. 5A, when the ratchet seat 30 is in a motion state of reversely rotating relative to the hub body 20 or when the ratchet seat 30 is in a stationary state after the ratchet seat 30 rotates reversely relative to the hub body 20, the disengaging state between the outer bevel gear 42 disposed on the ratchet seat 30 and the inner bevel gear 23 of the hub body 20 is resulted at that time as mentioned above. When the outer bevel gear 42 mounted on the ratchet seat 30 is disengaged from the inner bevel gear 23, the outer bevel gear 42 is still subjected to the pushing force exerted by the elastic body 44 in the direction toward the second end portion 24, so that the outer bevel gear 42 remains in a state in which the second annular bevel 423 abuts against the first annular bevel 232 of the inner bevel gear 23. In this way, no matter whether the outer bevel gear 42 meshes and enters the inner bevel gear 23 or the outer bevel gear 42 is disengaged from the inner bevel gear 23, no bouncing or repeated collision between the outer bevel gear 42 and the inner bevel gear 23 occur, thereby effectively reducing or preventing the noise due to collision when the outer bevel gear 42 and the inner bevel gear 23 are engaged or disengaged from each other.

Preferably, a length of the outer bevel gear 42 along the axial direction CL is less than or equal to a length of the inner bevel gear 23 along the axial direction CL, so that when the outer bevel gear 42 meshes and enters the inner bevel gear 23, the outer bevel teeth 422 of the outer bevel gear 42 could sufficiently mesh with the inner bevel teeth 231 of the inner bevel gear 23, thereby optimizing the transmission efficiency between the ratchet seat 30 and the hub body 20. In the current embodiment, the length of the outer bevel gear 42 along the axial direction CL is equal to the length of the inner bevel gear 23 along the axial direction CL. In other embodiments, even if the length of the outer bevel gear 42 along the axial direction CL is slightly less than the length of the inner bevel gear 23 along the axial direction CL, the engaging and disengaging function between the outer bevel gear 42 and the inner bevel gear 23 as described above could be achieved similarly.

The elastic body 44 is a spring and is disposed between the outer bevel gear 42 and the annular wall 36 of the ratchet seat 30 in a compressible manner. The elastic body 44 is adapted to push the outer bevel gear 42 toward the second end portion 24 along the axial direction CL, so that the outer bevel gear 42 is moved in a direction for meshing and entering the inner bevel gear 23. In other words, the elastic body 44 is adapted to push the outer bevel gear 42 along the axial direction CL to move in the direction for more deeply meshing with the inner bevel gear teeth 231 of the inner bevel gear 23. More specifically, one of two opposite ends of the elastic body 44 is accommodated in the spring groove 362 of the ratchet seat 30, and the other opposite end of the elastic body 44 is abutted by the outer bevel gear 42 in a compressible manner.

In the first embodiment, the inner bevel gear 23 fits in the first tube section 221 that is non-circular, but not limited thereto; the inner bevel gear 23 could be integrally provided on the first tube section 221 to form a monolithic unit.

Moreover, the abutting portion 2251 is provided on the inner peripheral edge the stop washer 225 that abuts against the annular inner wall 224 of the first tube section 221, so that the abutting portion 2251 is disposed on the inner side of the first end portion 22, but not limited thereto; the abutting portion 2251 for abutting against the outer bevel gear 42, which meshes and enters the inner bevel gear 23, could be formed directly on the first tube section 221, so that the outer bevel gear 42 could be kept meshing in the inner bevel gear 23.

In the first embodiment, the two ends of the axle tube 12 of the axle 10 respectively fit in the first axle seat 14 and the second axle seat, but not limited thereto; the axle 10 could be disposed as a shaft. The number of the first bearings 271 of the first bearing assembly 27 is not limited to two and could be one or plural, and the type of the first bearings 271 is not limited to rolling bearing. The number of the second bearings 311 of the second bearing assembly 31 is also not limited to two and could be one or plural, and the type of the second bearings 311 is not limited to rolling bearing.

Furthermore, in the first embodiment, the first annular bevel 232 is provided on the side wall of the inner bevel gear 23 facing the outer bevel gear 42 for being abutted by the second annular bevel 423 of the outer bevel gear 42 when the outer bevel gear 42 is disengaged from the inner bevel gear 23, thereby effectively guiding the outer bevel gear 42 to mesh and enter the inner bevel gear 23. In addition, the bicycle hub 100 of the present invention is mounted on a bicycle, a rotation speed of the outer bevel gear 42 driven by the ratchet seat 30 in actual practice is less than tens of revolutions per second, or even only a few revolutions; therefore, even if the first annular bevel 232 and the second annular bevel 423, which are for guiding, are not provided between the inner bevel gear 23 and the outer bevel gear 42 and only a side wall of the inner bevel gear 23, which is perpendicular to the axial direction CL, and a side wall of the outer bevel gear 42, which is perpendicular to the axial direction CL, abut against each other, the outer bevel gear 42 could be still pushed by the elastic body 44 and could mesh and enter the inner bevel gear 23 while rotating forwardly.

In the first embodiment of the invention, the extension direction of the outer spline 341 of the insertion tube 34 of the ratchet seat 30 is parallel to the axial direction CL, and an extension direction of the inner spline 421 on the inner peripheral surface of the outer bevel gear 42 is parallel to the axial direction CL, so that when the inner spline 421 of the outer bevel gear 42 meshes with the outer spline 341 of the insertion tube 34, the outer bevel gear 42 could only slide along the axial direction CL relative to the insertion tube 34 without being rotatable relative to the insertion tube 34. In addition, a second embodiment of the present invention is illustrated in FIG. 10 to FIG. 12A, wherein an outer peripheral surface of an insertion tube 34A of a ratchet seat 30A has an outer spline 341A; the outer spline 341A is inclined relative to the axial direction CL; an inner peripheral surface of an outer bevel gear 42A has an inner spline 421A, wherein the inner spline 421A is inclined relative to the axial direction CL; an outer peripheral surface of the outer bevel gear 42A has a plurality of outer bevel teeth 422A adapted to mesh with the inner bevel gear teeth 231 of the inner bevel gear 23.

More specifically, in the second embodiment, the outer spline 341A includes a plurality of helical teeth 3411A arranged at regular intervals around the outer spline 341A. Each of the helical teeth 3411A is inclined relative to the axial direction CL. To match with the helical teeth 3411A, the inner spline 421A of the outer bevel gear 42A includes a plurality of helical grooves 4211A arranged at regular intervals around the inner spline 421A, wherein each of the helical grooves 4211A is inclined relative to the axial direction CL. The helical teeth 3411A of the outer spline 341A of the insertion tube 34A mesh with the helical grooves 4211A of the inner spline 421A of the outer bevel gear 42A. An inclination direction of each of the helical teeth 3411A is the same as an inclination direction of each of the helical grooves 4211A. The inclination direction of each of the helical teeth 3411A is opposite to the inclination direction of each of the inner bevel teeth 231 of the inner bevel gear 23.

Referring to FIG. 10 to FIG. 12A, because the helical teeth 3411A of the insertion tube 34A mesh with the helical grooves 4211A of the outer bevel gear 42A, the ratchet seat 30A and the insertion tube 34A, which rotate forwardly relative to the hub body 20, drive the outer bevel gear 42A to move toward the second end portion 24 along the axial direction CL. During the movement, the outer bevel gear 42A meshes with the inner bevel gear 23 and gradually enters the inner bevel gear 23, and eventually the outer bevel gear 42A is abutted by the abutting portion 2251 of the stop washer 225, so that the outer bevel gear 42A is maintained meshing in the inner bevel gear 23; meanwhile, the ratchet seat 30A that rotates forwardly could drive the hub body 20 to rotate forwardly through the outer bevel gear 42A.

Figure 10:
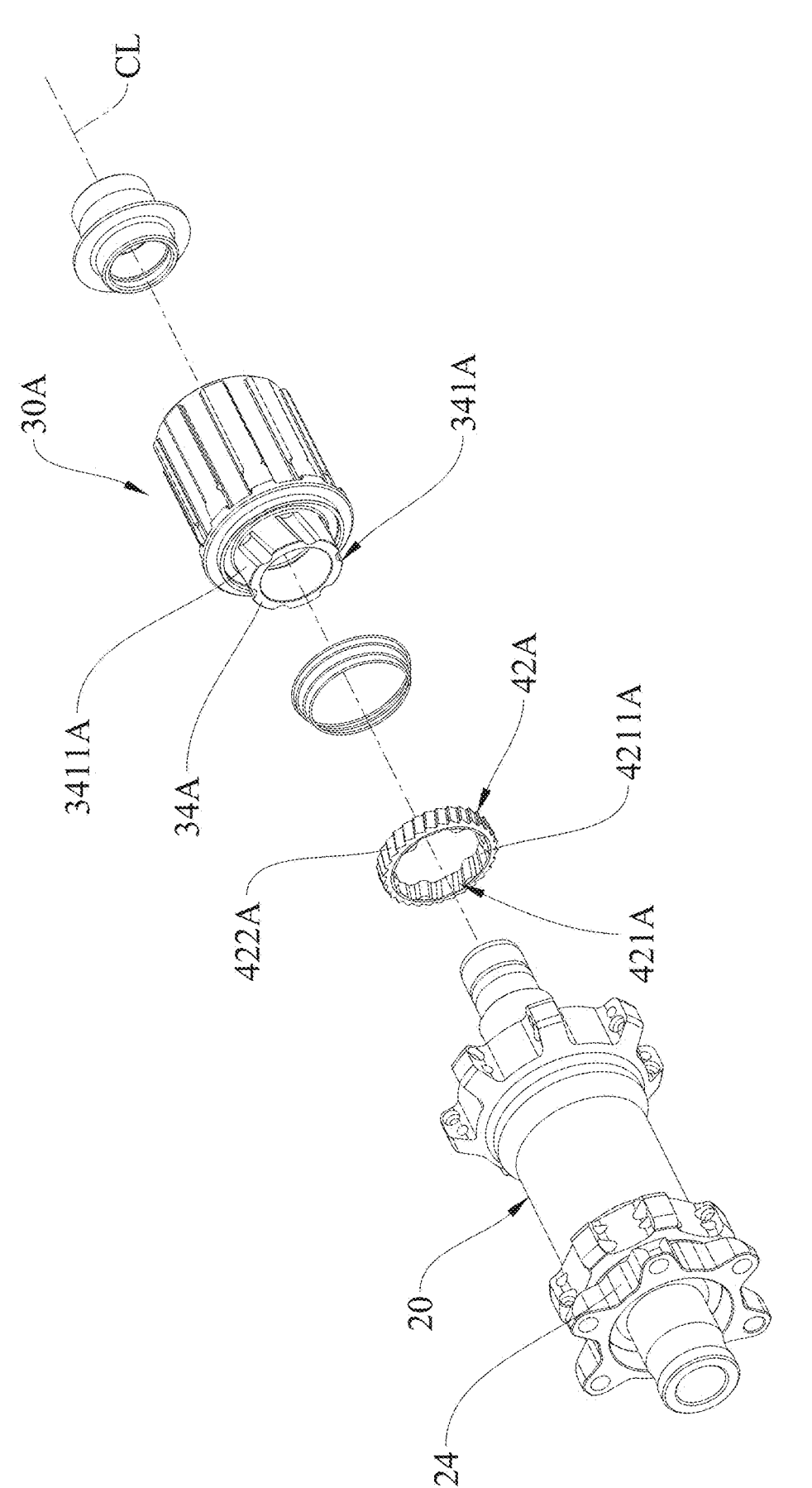
FIG. 10 is a perspective schematic view of the ratchet seat and the clutch assembly according to a second embodiment of the present invention.
Figure 11:
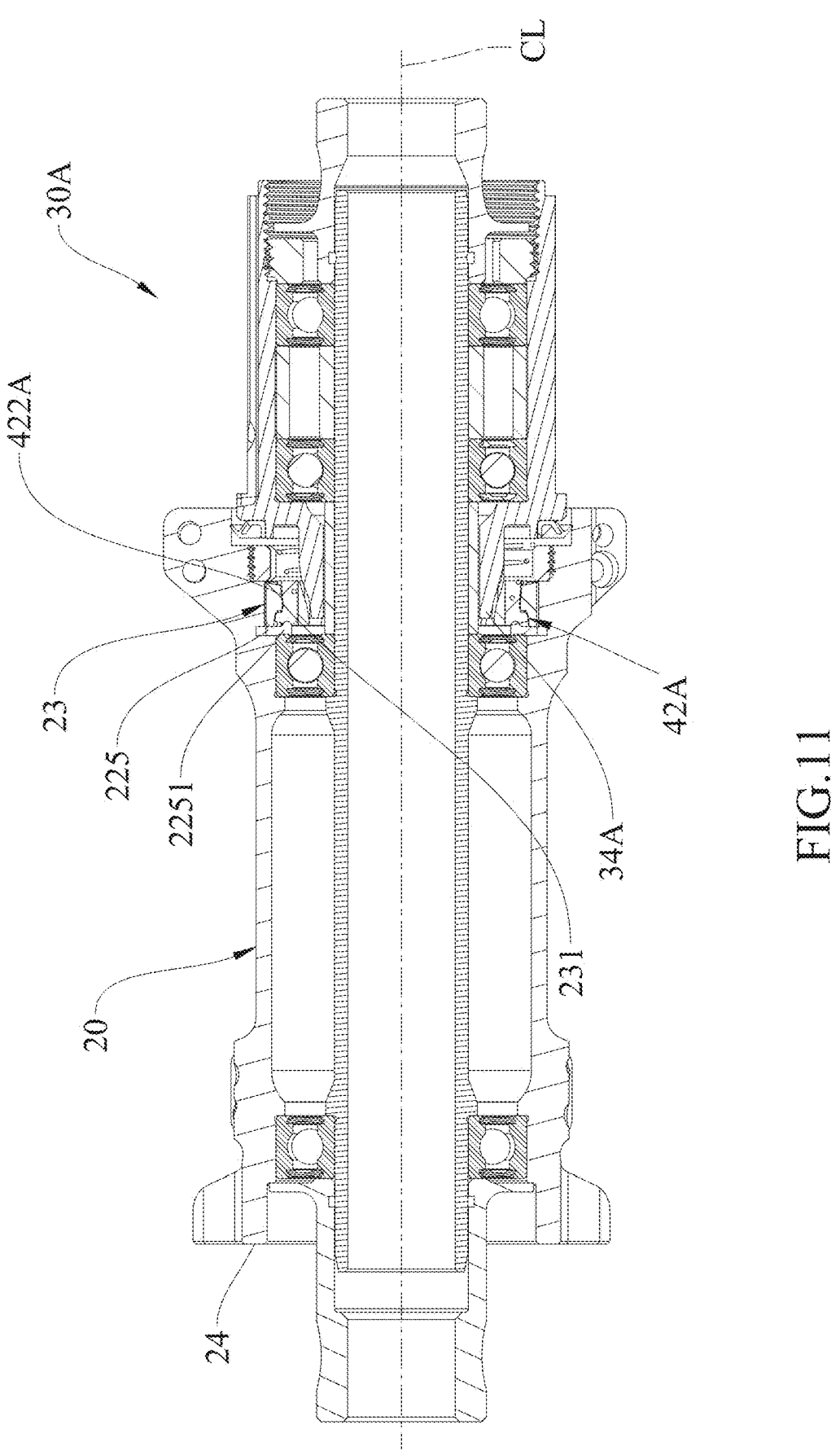
FIG. 11 a sectional schematic view of the bicycle hub according to the second embodiment of the present invention.
Figure 12A:
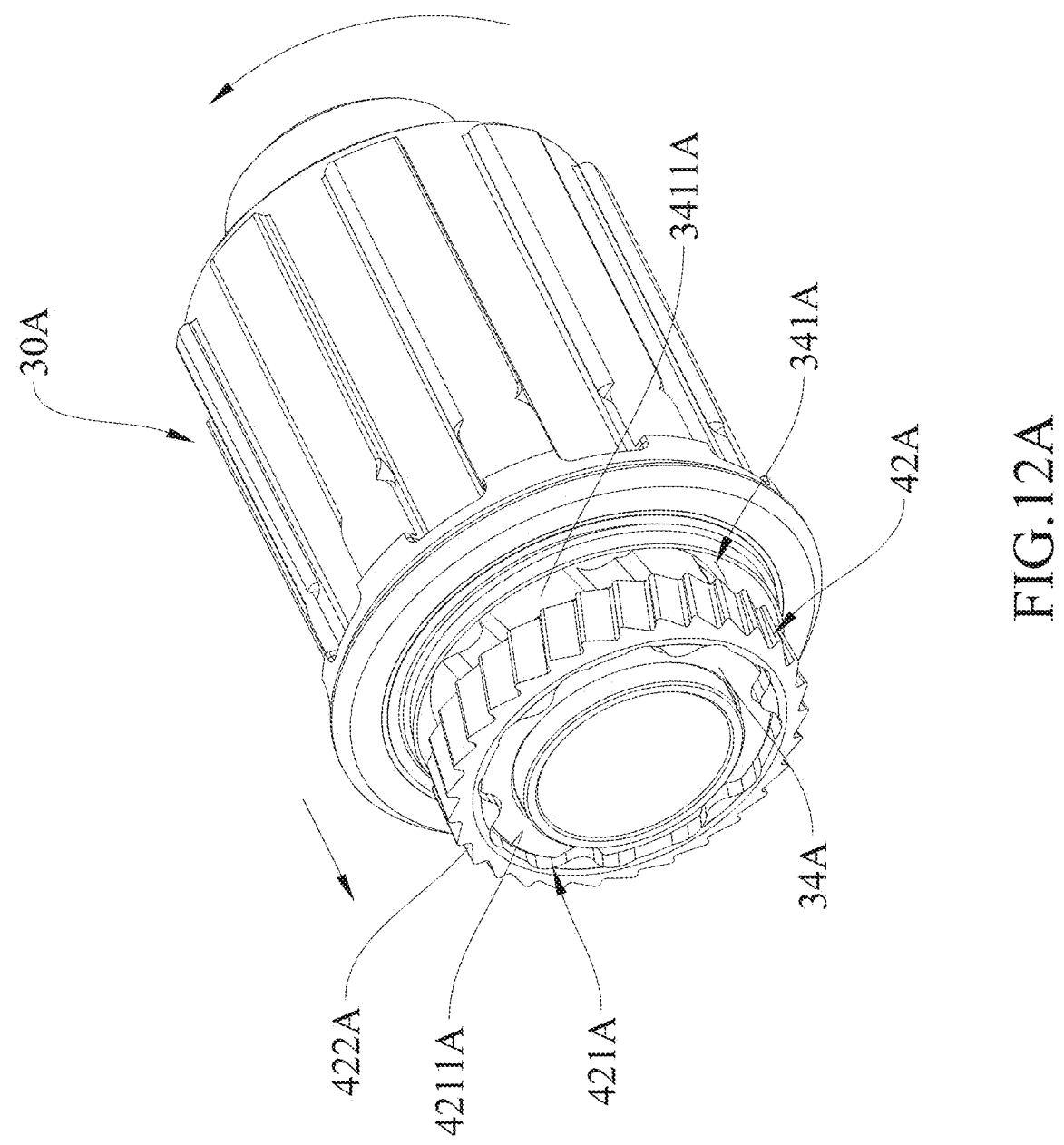
FIG. 12A is a schematic view showing that the ratchet seat shown in FIG. 10 rotates forwardly to drive the outer bevel gear to move.
Figure 12B:
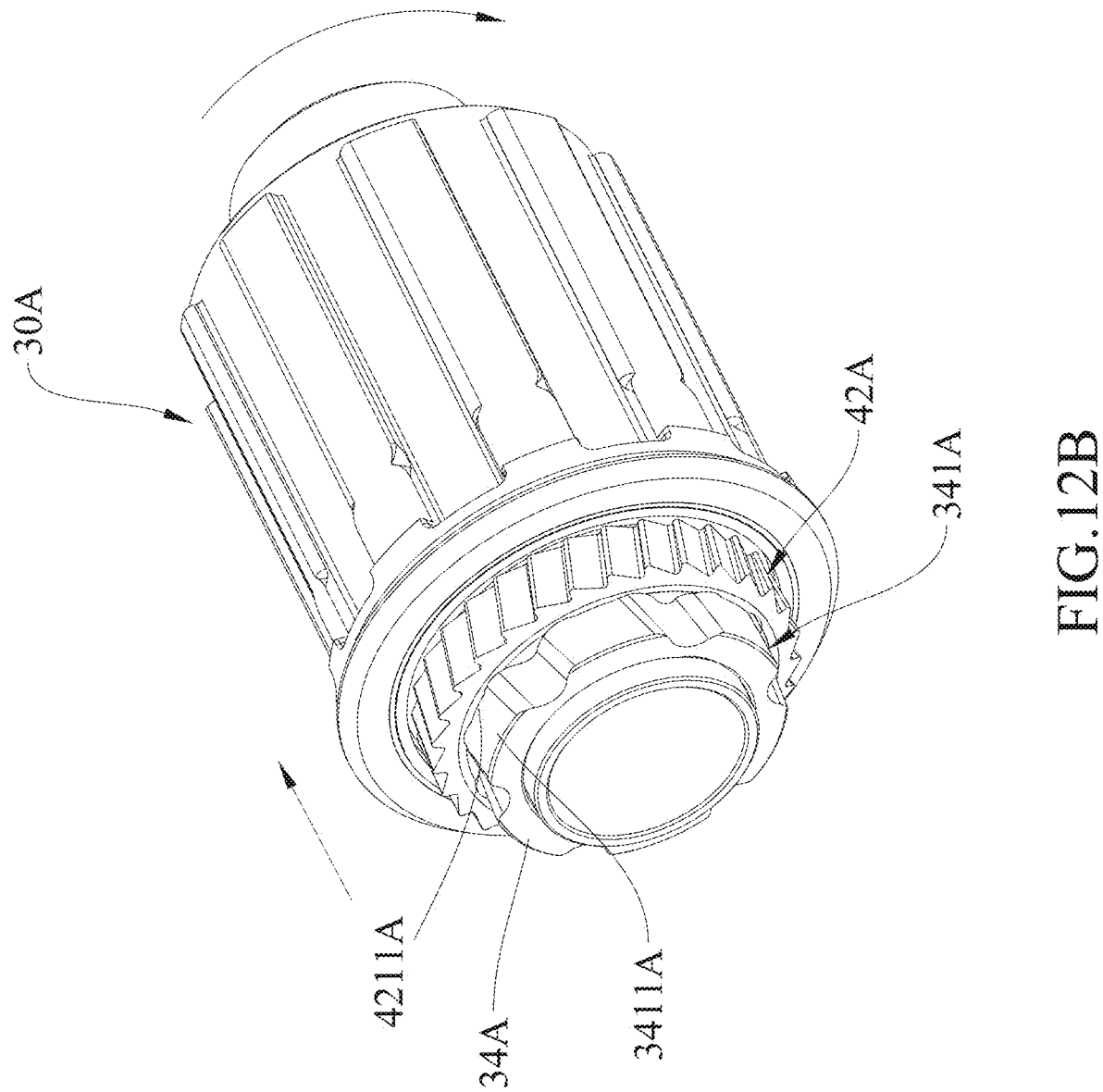
FIG. 12B is a schematic view showing that the ratchet seat shown in FIG. 10 rotates reversely to drive the outer bevel gear to move.

On the other hand, referring to FIG. 10, FIG. 11, and FIG. 12B, the ratchet seat 30A and the insertion tube 34A, which rotate reversely relative to the hub body 20, drive the outer bevel gear 42A move away from the second end portion 24 along the axial direction CL, and eventually a disengaging state between the outer bevel gear 42A and the inner bevel gear 23 is resulted. Therefore, the ratchet seat 30A, which rotates reversely relative to the hub body 20, is not driven by the hub body 20, which rotates forwardly relative to the ratchet seat 30A, for rotating forwardly, or the ratchet seat 30A, which rotates reversely, does not drive the hub body 20 for rotating reversely at the same time. The other components and the operating way of the second embodiment of the present invention are the same as described in the first embodiment and is not repeated here.

It must be pointed out that the embodiments described above are only some preferred embodiments of the present invention. All equivalent structures which employ the concepts disclosed in this specification and the appended claims should fall within the scope of the present invention.

What is claimed is:

1. A bicycle hub, comprising an axle, a hub body, a ratchet seat, and a clutch assembly, wherein:

an axis of the axle is defined as an axial direction;

the hub body coaxially and rotatably fits around the axle; two opposite sides of the hub body in the axial direction have a first end portion and a second end portion respectively; an inner side of the first end portion, along a direction from the second end portion to the first end portion, sequentially has an abutting portion and an inner bevel gear that is concentrical with the axle; an inner peripheral surface of the inner bevel gear has a plurality of inner bevel teeth around the axle, wherein each of the plurality of inner bevel teeth is inclined relative to the axial direction;

the ratchet seat coaxially and rotatably fits around the axle; the ratchet seat has a freehub body, an insertion tube, and an annular wall that is connected between the freehub body and the insertion tube; the insertion tube has an outer diameter less than an outer diameter of the freehub body; the insertion tube is inserted into the first end portion; and the clutch assembly includes an outer bevel gear and an elastic body; the outer bevel gear fits around the insertion tube in a manner that the outer bevel gear is slidable only in the axial direction; an outer peripheral surface of the outer bevel gear has a plurality of outer bevel teeth; the plurality of outer bevel teeth surround the axle and are adapted to mesh with the plurality of inner bevel teeth; each of the plurality of outer bevel teeth is inclined relative to the axial direction; when the outer bevel gear meshes and enters the inner bevel gear, the outer bevel gear is abutted by the abutting portion to be retained in the inner bevel gear; the elastic body is disposed between the outer bevel gear and the annular wall in a compressible manner and is adapted to push the outer bevel gear toward the inner bevel gear along the axial direction.

2. The bicycle hub as claimed in claim 1, wherein an outer peripheral surface of the insertion tube has an outer spline; an extension direction of the outer spline is parallel to the axial direction; an inner peripheral surface of the outer bevel gear has an inner spline; the inner spline meshes with the outer spline in a manner that the inner spline is slidable along the axial direction.

3. The bicycle hub as claimed in claim 1, wherein each of the plurality of inner bevel teeth is a ratchet tooth; each of the plurality of outer bevel teeth is a ratchet tooth; at least a portion of the abutting portion directly faces, along the axial direction, a side of the outer bevel gear facing the second end portion.

4. The bicycle hub as claimed in claim 3, wherein the hub body has an axle hole along the axial direction for the axle to pass through; a portion of the axle hole corresponding to the first end portion forms a first tube section and a second tube section sequentially in the direction from the second end portion to the first end portion; the first tube section is a non-circular groove, wherein a side of the first tube section facing the second end portion has an annular inner wall; a stop washer abuts against the annular inner wall; the abutting portion is formed on the stop washer; the inner bevel gear fits in the first tube section; a fixing ring is detachably engaged with the second tube section; the fixing ring restricts the inner bevel gear within the first tube section.

5. The bicycle hub as claimed in claim 4, wherein a radial length of the first tube section along a direction perpendicular to the axial direction is less than a radial length of the second tube section along the direction perpendicular to the axial direction; a third tube section is formed on the portion of the axle hole corresponding to the first end portion; the third tube section is located on a side of the second tube section away from the second end portion; the annular wall is concentrically connected to a protruding ring; a sealing ring fits in the third tube section and has a ring disk, wherein the ring disk has an end edge that abuts against an outer peripheral surface of the protruding ring.

6. The bicycle hub as claimed in claim 5, wherein a portion of the annular wall located between the protruding ring and the insertion tube forms a spring groove; the elastic body is a spring, wherein an end of the elastic body is accommodated in the spring groove, and another end of the elastic body abuts against by the outer bevel gear in a compressible manner.

7. The bicycle hub as claimed in claim 1, wherein the hub body has an intermediate tube; two opposite sides of the intermediate tube in the axial direction are respectively connected to the first end portion and the second end portion; a first bearing assembly is disposed on an inner peripheral surface of the intermediate tube; a second bearing assembly is disposed on an inner peripheral surface of freehub body of the ratchet seat; the axle includes an axle tube, a first axle seat, and a second axle seat; the axle tube rotatably passes through the first bearing assembly and the second bearing assembly; two opposite ends of the axle tube have a first end and a second end respectively; the first end of the axle tube penetrates out of the first end portion; the second end of the axle tube penetrates out of the second end portion; the first axle seat fits around the first end of the axle tube; the second axle seat fits around in the second end of the axle tube.

8. The bicycle hub as claimed in claim 7, wherein the first bearing assembly includes two first bearings; each of the two first bearings is rotatably disposed between the intermediate tube and the axle tube; the second bearing assembly includes two second bearings, each of the two second bearings is rotatably disposed between the freehub body and the axle tube.

9. The bicycle hub as claimed in claim 1, wherein an outer peripheral surface of the insertion tube has an outer spline; the outer spline includes a plurality of helical teeth; each of the plurality of helical teeth is inclined relative to the axial direction; an inner periphery surface of the outer bevel gear has an inner spline; the inner spline includes a plurality of helical grooves; each of the plurality of helical grooves is inclined relative to the axial direction; the plurality of helical teeth of the outer spline mesh with the plurality of helical grooves of the inner spline.

* * * * *